O. F. BECKER.
ATOMIZER.
APPLICATION FILED JUNE 28, 1913.
1,098,876.
Patented June 2, 1914.
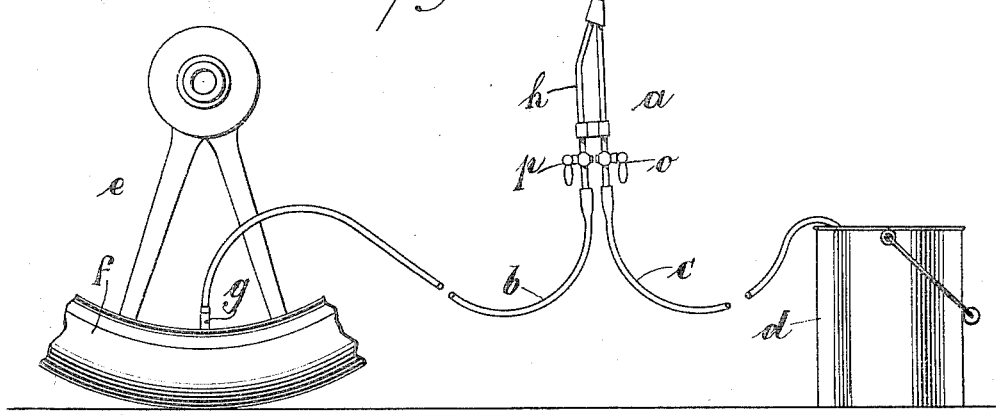
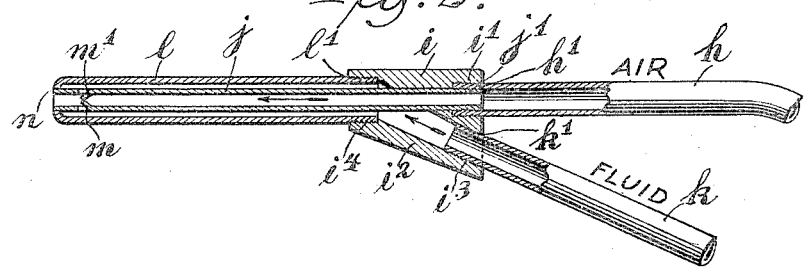
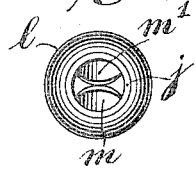
Witnesses:
A. R. Appleman
Marie Leahy
Inventor
Otto F. Becker
By his Attorney
L. K. Böhm

UNITED STATES PATENT OFFICE.

OTTO F. BECKER, OF NEW YORK, N. Y.

ATOMIZER.

1,098,876. Specification of Letters Patent. Patented June 2, 1914.

Application filed June 28, 1913. Serial No. 776,291.

*To all whom it may concern:*

Be it known that I, OTTO F. BECKER, a citizen of the United States of America, and a resident of New York, in the county and State of New York, have invented certain new and useful Improvements in Atomizers, of which the following is a specification.

This invention has reference to improvements in atomizers to be used for cleaning machinery, for spraying tobacco, settling dust in mines to prevent explosions, spraying flowers and similar purposes.

The present invention pertains particularly to a novel device for cleaning the propelling mechanism of motor-cars and motor vehicles, especially of automobiles and motor trucks. The novel device pertains to that type of cleaning devices in which a light cleansing fluid, such as a light liquid hydrocarbon is used for removing dirt, dust and spent lubricant.

The novel apparatus is operated by means of fluid pressure and the current produced thereby carries along the cleansing liquid. While some former devices of this kind required a fluid pressure reservoir, containing for instance compressed air, with a pressure in said reservoir of about 100 lbs. per square inch, the present cleaning device may be operated with very little pressure and in case of necessity even by blowing with the mouth. This has been primarily attained by constructing the apparatus on the principle of an atomizer for the purpose of producing and diffusing a fine spray by means of which the cleansing of the machine parts is effected both mechanically and chemically. The novel cleaning device requiring but little force for its operation, may easily be attached to a pneumatic tire of a motor vehicle or an automobile wherein more power is stored than is required for this purpose. This makes the apparatus a great convenience because no fluid pressure tank need be carried along while the driver of a motor vehicle always has an air pump to pump up the tire when required.

In order to render the invention entirely clear reference is had to the accompanying drawing in which—

Figure 1 represents in side elevation a novel cleaning device embodying in desirable form the present improvements and showing a connection with a tire, and a vessel for the cleansing fluid. Fig. 2 illustrates on an enlarged scale, partly in section, the operative parts of the device. Fig. 3 is a front end view of the device on an enlarged scale.

Similar characters of reference denote like parts in all the figures.

In the drawing, in Fig. 1, $a$ represents the novel cleaning device, $b$, $c$ are flexible connections attached thereto, $d$ is the vessel containing the light liquid hydrocarbon such as gasolene or kerosene, $e$ is a sectional part of a wheel showing a pneumatic tire $f$ to the valve $g$ of which the flexible connection, preferably the rubber hose, $b$ is attached.

The construction of the operative parts of the apparatus is apparent from Figs. 2 and 3.

The novel cleaning device consists essentially of an air conduit $h$ having at its front end a screw thread $h^1$. An intermediary connecting member or part $i$ is provided in its top rear portion with a screw thread $i^1$ adapted to receive the threaded front end portion of the air conduit $h$. A narrow air tube $j$ with exteriorly threaded rear end portion $j^1$ is attached to the interiorly threaded front end portion of the air conduit $h$. The intermediary connecting member $i$ has a slanting bottom portion $i^2$ with interiorly threaded rear end portion $i^3$ into which fits the fluid conduit $k$ which is provided with an exteriorly threaded front end portion $k^1$. The front end portion of the connecting member $i$ has an interiorly threaded front end portion $i^4$ into which fits a relatively wide tube $l$ by virtue of its exteriorly threaded rear end portion $l^1$. The tube $l$ is adapted to house the narrow tube $j$ of the air conduit, as shown in Fig. 2. Thus a passage for the cleansing fluid is created between the tubes $l$ and $j$. The front end portion of the tube $j$ is soldered or otherwise suitably secured to the front end portion of the tube $l$ whereby it is prevented that any cleansing fluid passes out between the front ends of the tubes $l$ and $j$. For the purpose of rendering it possible to create and diffuse a fine spray of cleansing fluid and air, the inner tube $j$ of the air conduit has formed near its front end a peculiarly shaped atomizer device. This device is formed directly in the tube $j$ by means of a special tool which presses in two oppositely located small leaves or flaps $m$, $m^1$. These are slantingly formed in a forward direction and being practically semi-circular, touch with their peripheral points as shown on an enlarged scale in Fig. 3. By forcing in the two semi-circular flaps $m$, $m^1$ two openings are created in the tube $j$ through which the cleansing fluid supplied by the tube $k$ and passing through the space between the tubes $l$ and $j$ may enter said air tube $j$ wherein it is co-mingled with the current of air and issued through the nozzle $n$ in form of a fine, well diffused spray. The front ends of the openings created in the tube $j$ by the formation of the flaps $m$, $m^1$ are straight, as shown in Fig. 2, and the cleansing fluid passes only along the slanting surfaces of said flaps, giving it thus a forward direction.

In the described manner a finely diffused spray of cleansing fluid and air is produced by means of a device resembling in its operation the action of an atomizer. It is evident that the quantity of cleansing fluid is proportional to the size of the openings near the flaps $m$, $m^1$ located in the inner tube $j$ and to the force of the current of air. In order to regulate the flow of both the supply of cleansing fluid and the supply of air valves may be provided at the rear end of the device, if desired, or one valve alone may be provided in one or the other conduit if this appears to be desirable for special application. In Fig. 1 of the drawing the valve $o$ is purposed to regulate the cleansing fluid and the valve $p$ the supply of air.

I claim as my invention:

1. An atomizer for spraying fluid comprising an outer tube for the liquid and an inner tube for the air both united in the front to close the space between said tubes, and an atomizing device in the front portion of the air tube composed of two semi-circular leaves formed by pressing in a portion of the wall of the air tube thus creating openings leading from the liquid tube into the air tube, said leaves touching with their peripheral ends, and slantingly arranged in a forward direction.

2. An atomizer for spraying fluid comprising an intermediary support, an air conduit passing through said support, a tube for the fluid in said support having a front portion surrounding the air tube, and an atomizing device in the front portion of the air tube composed of two semi-circular leaves formed by pressing in a portion of the wall of the air tube thus creating openings leading from the liquid tube into the air tube, said leaves touching with their peripheral ends, and slantingly arranged in a forward direction.

3. In an atomizer for spraying fluid, separate conduits for the air and cleansing fluid, an intermediary support, and an atomizing device in the front portion of the air tube composed of two semi-circular leaves formed by pressing in a portion of the wall of the air tube thus creating openings leading from the liquid tube into the air tube, said leaves touching with their peripheral ends, and slantingly arranged in a forward direction.

4. An atomizer for spraying liquid and air for cleansing motor vehicles comprising an outer tube for the liquid and an inner tube for the air both united in the front to close the space between said tubes, an atomizing device in the front portion of the air tube composed of two semi-circular leaves formed by pressing in a portion of the wall of the air tube thus creating openings leading from the liquid tube into the air tube, said leaves touching with their peripheral ends, and slantingly arranged in a forward direction, and means on the air tube for connecting it with the pneumatic tire of the motor vehicle.

Signed at New York, N. Y., this 25th day of June, 1913.

OTTO F. BECKER.

Witnesses:
OTTO L. NEICHERT,
MARIE LEAHY.